J. G. & B. F. SMITH.
DEVICE FOR CONNECTING CHAINS.
APPLICATION FILED MAR. 4, 1915.

1,167,441.

Patented Jan. 11, 1916.

Witnesses
J. R. Timen
R. L. Parker.

J. G. Smith and
B. F. Smith Inventors,
by Chnow & Co.
Attorneys.

UNITED STATES PATENT OFFICE.

JOHN G. SMITH AND BENJAMIN F. SMITH, OF WAHOO, NEBRASKA.

DEVICE FOR CONNECTING CHAINS.

1,167,441.  Specification of Letters Patent.  Patented Jan. 11, 1916.

Application filed March 4, 1915. Serial No. 12,177.

*To all whom it may concern:*

Be it known that we, JOHN G. SMITH and BENJAMIN F. SMITH, citizens of the United States, residing at Wahoo, in the county of Saunders, State of Nebraska, have invented a new and useful Device for Connecting Chains, of which the following is a specification.

The device forming the subject matter of this application is adapted to retain a link at the end of a chain or an eye at the end of a moving part, the construction being such that the link or eye although securely retained against accidental displacement may nevertheless be detached readily, manually and at the will of an operator.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

Figure 1:
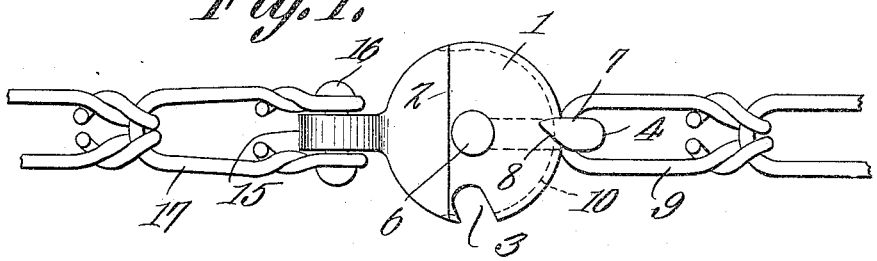
Figure 2:
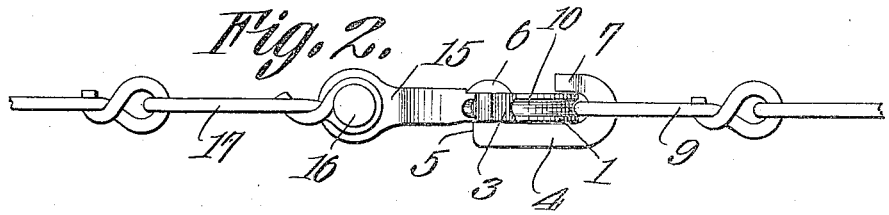
Figure 3:
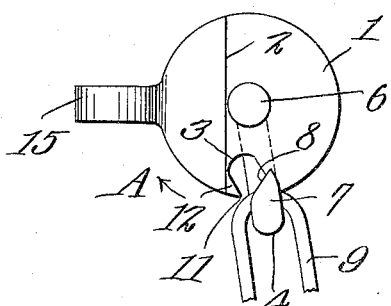
Figure 4:
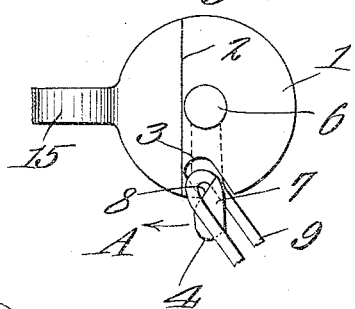
Figure 5:
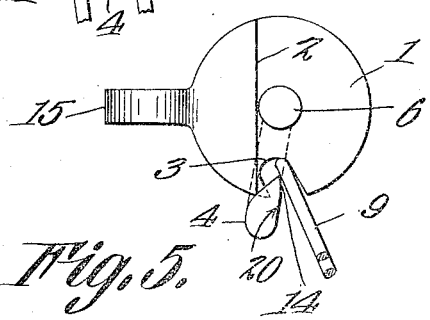

In the accompanying drawing:—Figure 1 shows the invention in top plan; Fig. 2 is a side elevation; Figs. 3, 4 and 5 are fragmental top plans diagrammatic in nature and illustrating successive steps in the operation of the structure.

The device herein disclosed comprises a head 1 in the form of a disk and preferably of circular contour, the head 1 being provided with an upstanding, transverse stop shoulder 2. In the periphery of the head 1 adjacent one end of the stop shoulder 2 there is formed a notch 3. The invention includes a hook 4 mounted to swing parallel to the plane defined by the head 1 and with this end in view, one end 5 of the hook is rectangularly disposed and is journaled in the head 1 adjacent its center, the extremity of the end 5 being butt ended if desired as shown at 6 to retain the hook in place on the head. The outer end of the hook comprises a bill 7 overhanging the head, and in the curve of the bill the periphery of the head 1 is received. One edge of the bill 7 of the hook is beveled as shown at 8 to define an inclined face located approximately at right angles to the plane defined by the head 1. In the periphery of the head 1 there is formed a groove 10.

The numeral 9 indicates a link at one end of a chain, the link being engaged with the bill 7 of the hook and the end of the link being adapted to traverse the groove 10 in the head 1. Since the end 5 of the hook 4 is journaled in the head 1, the hook and the chain of which the link constitutes a part may swing about readily. However, as will be obvious when Fig. 2 is compared with Fig. 1, an accidental displacement of the link 9 from the bill of the hook cannot readily take place, a comparatively simple manual operation being necessary in order to detach the link 9.

The head 1 may be adapted for a variety of uses and may be constructed in different ways so far as is concerned the mounting of the head. In the present instance, but not of necessity, the head is shown as equipped with a radial finger 15 through which passes a rivet 16 or the like engaging one link 17 of a chain. Obviously, the links 9 and 17 may constitute parts of the same chain and, indeed, the device, in the hands of a skilled mechanic and with the present disclosure before him, may be readily adapted for connection with elements other than the chain of which the link 17 constitutes a member.

The point of the bill 7 of the hook moves in an arc which intersects the notch 3 and the operation of the structure is as follows:—The hook 4 is swung around in the direction of the arrow A until the beveled edge 8 of the bill 7 of the hook lies adjacent to but spaced from the point 12 defined in the periphery of the head 1 by the notch 3, thus to form, between the beveled face 8 and the point 12 an opening which is designated by the reference character 11 in Fig. 3. The link 9 then is tilted to a vertical position, Fig. 4 illustrating the position which the link will assume during this tilting movement. After the link is vertically disposed, the hook is swung in the direction of the arrow A until the point 14 of the hook lies to one side of the link as clearly shown in Fig. 5. The link may then be withdrawn. To restore the link to a locked position, the operation above described is reversed.

Especial attention is directed to the beveled edge 8 of the bill of the hook. Since this edge is beveled the link may be tilted up vertically from the position of Fig. 3 to the position of Fig. 4 and since the bill of the hook is beveled as above described a sufficient movement of the bill of the hook in the direction of the arrow A will take place so that the point of the hook will dispose to one side of the link as shown in Fig. 5, thereby permitting a withdrawal of the link.

The bill of the hook coacts with the stop shoulder 2 in a manner clearly understood when Fig. 5 is examined, and the bill of the hook is thus held in such a position that one side face of the bill, indicated by the reference character 20 in Fig. 5 coacts with the curve of the link 9 to direct the same into the notch 3 when the operation of restoring the link to a locked position is begun.

Having thus described the invention, what is claimed is:—

1. In a device of the class described, a head having a notch; and a hook disposed substantially at right angles to the head, the hook including a shank pivoted to one side of the head to move parallel thereto, the hook including a bill overhanging the other side of the head and adapted to coöperate with the notch, the bill including a beveled edge disposed substantially at right angles to the said other side of the head.

2. In a device of the class described, a head having a notch; and a hook disposed substantially at right angles to the head, the hook including a shank pivoted to one side of the head to move parallel thereto, the hook including a bill overhanging the other side of the head, the head being provided with a link-receiving peripheral groove, the bill of the hook constituting a link-retaining means coacting with the notch.

3. In a device of the class described, a head having a notch; and a hook pivoted to the head to move parallel thereto, the hook including a bill receiving the edge of the head and coöperating with the notch, the bill including a beveled edge disposed substantially at right angles to the plane of the head, and the head being provided with a stop shoulder engaging the beveled edge of the bill whereby the opposite edge of the bill will be disposed at an angle to one edge of the notch to define a link-receiving throat.

In testimony that we claim the foregoing as our own, we have hereto affixed our signatures in the presence of two witnesses.

JOHN G. SMITH.
BENJAMIN F. SMITH.

Witnesses:
FRED WEETH,
FRED L. SMITH.

Copies of this patent may be obtained for five cents each, by addressing the "Commissioner of Patents, Washington, D. C."